United States Patent [19]

Stack et al.

[11] Patent Number: 5,108,293

[45] Date of Patent: Apr. 28, 1992

[54] METHOD AND APPARATUS FOR DISPLAYING A BEAM OF LIGHT

[75] Inventors: John M. Stack, Trenton; Frank S. DiMinno, Cherry Hill, both of N.J.

[73] Assignee: Edmund Scientific Company, Barrington, N.J.

[21] Appl. No.: 583,182

[22] Filed: Sep. 14, 1990

[51] Int. Cl.⁵ .............................................. G09B 23/22
[52] U.S. Cl. .................................... 434/303; 356/336
[58] Field of Search ................ 434/303; 356/336, 338, 356/339, 343, 367; 283/88

[56] References Cited

U.S. PATENT DOCUMENTS

| | | | |
|---|---|---|---|
| 2,935,797 | 5/1960 | Morris | 434/303 |
| 3,892,485 | 7/1975 | Merritt et al. | |
| 4,118,625 | 10/1978 | Underwood | |
| 4,265,538 | 5/1981 | Wertheimer | 356/336 X |
| 4,444,500 | 4/1984 | Flinsenberg et al. | 356/336 |
| 4,953,978 | 9/1990 | Bott et al. | 356/336 |
| 4,975,237 | 12/1990 | Brown | 356/338 |

FOREIGN PATENT DOCUMENTS

| | | | |
|---|---|---|---|
| 786531 | 6/1968 | Canada | 434/303 |
| 243086 | 9/1989 | Japan | 434/303 |
| 1045247 | 9/1983 | U.S.S.R. | 434/303 |
| 1527652 | 12/1989 | U.S.S.R. | 434/303 |

OTHER PUBLICATIONS

Powder Metallurgy International, vol. 10, No. 2, 1978, pp. 97-98.

Primary Examiner—Robert Bahr
Attorney, Agent, or Firm—Howson & Howson

[57] ABSTRACT

Apparatus for and a method of displaying a laser beam are provided. The apparatus comprises an elongate chamber which has a viewing window and which is filled with a clear aqueous suspension of a water-dispersible polymer. The laser beam is displayed by projecting it into the suspension-filled chamber through one end of the chamber.

22 Claims, 2 Drawing Sheets

METHOD AND APPARATUS FOR DISPLAYING A BEAM OF LIGHT

FIELD OF THE INVENTION

This invention relates to the scattering of a beam of light in a fluid medium, and more particularly to an improved method and apparatus for displaying the path of a beam of light through a liquid medium.

BACKGROUND OF THE INVENTION

Valuable knowledge relating to the characteristics of transmitted light may be learned by studying a beam of transmitted light. It would be helpful to those studying the physics of light if stable means to demonstrate the passage of a beam of light through a transparent medium were available. However, transmitted light, such as a light beam, cannot be seen as it passes through a vacuum or a clear homogeneous medium, such as a colorless gas or liquid, like air or water. A beam of light passing through empty space or a clear homogeneous liquid is only visible when it is scattered by, i.e. reflected off the surface of, an object in the space or liquid. The object which scatters the light beam may be large, such as a piece of furniture, or very tiny, such as a minute particle of matter.

A currently practiced method of rendering a beam of light visible in a chamber involves the creation of a suspension of fine particles in the chamber and passing the beam of light through the chamber. The beam of light becomes visible as it reflects off the surfaces of the particles. For example, a beam of light has been studied by transmitting it through a chamber in which a fog was created by the evaporation of liquefied carbon dioxide in the chamber. The rapid evaporation of the carbon dioxide causes moisture in the chamber to condense into tiny droplets of water which are capable of scattering a beam of light passing through the chamber, thereby making the light visible. Similarly, a beam of light has been made visible in a closed chamber by injecting a small amount of smoke into the chamber. The smoke renders the light beam visible as it passes through the chamber. Unfortunately, the fog and smoke used in these techniques are short-lived and the procedure has to be continuous or frequently repeated to maintain an atmosphere in the chamber in which the beam of light is visible.

Because of the educational and scientific benefits and advantages derived from the examination of a beam of light, there is a continuing search for improved apparatus and methods for displaying a lightbeam as it passes through a medium.

OBJECTS OF THE INVENTION

It is an object of the invention to provide an improved apparatus and method for displaying a beam of light in a closed chamber. It is another object of the invention to provide a stable system for displaying a beam of light in a closed chamber. These and other objects and advantages of the invention will become apparent from the following description of the invention, taken with the accompanying drawings.

SUMMARY OF THE INVENTION

According to one aspect of the invention the apparatus in which the beam of light is to be displayed comprises an elongate chamber filled with a liquid suspension of fine particles. The term "suspension", as used herein, includes both suspensions of solid particles and suspensions of liquid particles, i.e. emulsions. In one preferred embodiment of the invention the elongate chamber is rectangular in cross-section, one of its end walls has a window for transmitting a beam of light into the chamber, its front wall is transparent, and its other end wall and its top, bottom an rear walls are opaque. In an alternate embodiment, the chamber is circular in cross-section, one end wall has a window for transmitting a beam of light through the chamber, the cylindrical side wall of the chamber is transparent and the other end wall is opaque.

In both embodiments, the chamber is filled with a dilute suspension which comprises a clear, preferably colorless liquid as the continuous phase and tiny discrete particles of solid matter as the disperse phase. In a preferred embodiment of the invention, the continuous phase is water and the disperse phase is a polymeric substance. In the most preferred embodiment the dispersed phase is an acrylic polymer or mixture of acrylic polymers.

The apparatus of the invention is particularly useful for displaying a laser beam having a wavelength in the visible range, i.e. about 400 to 770 nm (nanometers), however it can also be used to project a beam of light in the near infrared range, i.e. about 770 to 1,000 nm. In the later case, the beam is not visible to the naked eye, but it can be viewed using special infrared viewers.

The average particle size of the suspended matter is generally in the range of about 150 to about 600 nanometers and is preferably in the range of about 400 to about 600 nanometers.

The concentration of the disperse phase in the continuous phase is generally in the range of about 1,000 to about 4,000 ppm (parts per million) and it is preferably in the range of about 1,000 to about 2,000 ppm, both ranges being based on the weight of the continuous phase.

The method of the invention is practiced by directing a collimated light beam, preferably a laser beam, into the above-described liquid suspension-filled chamber through a window in the end panel of the chamber. The light beam may be made to follow any desired path within the chamber by using mirrors and prisms to deflect it, and in the case of the cylindrical chamber, the beam can be reflected off the cylindrical side wall of the chamber to produce various patterns and to demonstrate, by simulation, the transmission of light through an optical fiber.

BRIEF DESCRIPTION OF THE DRAWINGS

The invention is illustrated in the accompanying drawings in which.

DETAILED DESCRIPTION OF THE INVENTION

The invention can be used to display any collimated beam of light and is particularly suitable for displaying a visible laser beam. Accordingly, the invention will be described as it applies to a displayed laser beam. Laser beams displayed in the apparatus of the invention can have a wavelength anywhere in the visible and near infrared ranges of the electromagnetic wave spectrum. Laser beams particularly well suited for display in the invention are those having a wavelength in the range of about 450 to 1,000 nm.

Figure 1:
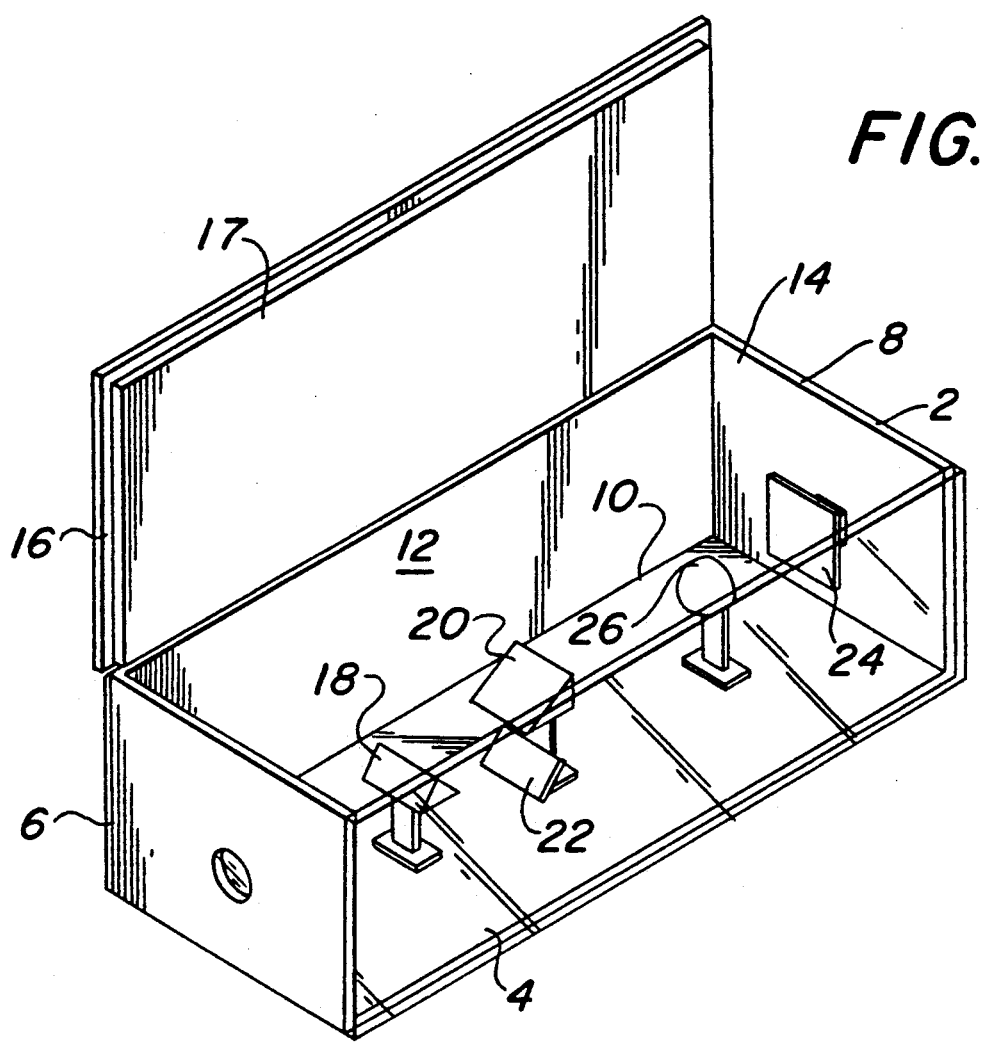
FIG. 1 is a view in perspective of one embodiment of the invention.
Figure 2:
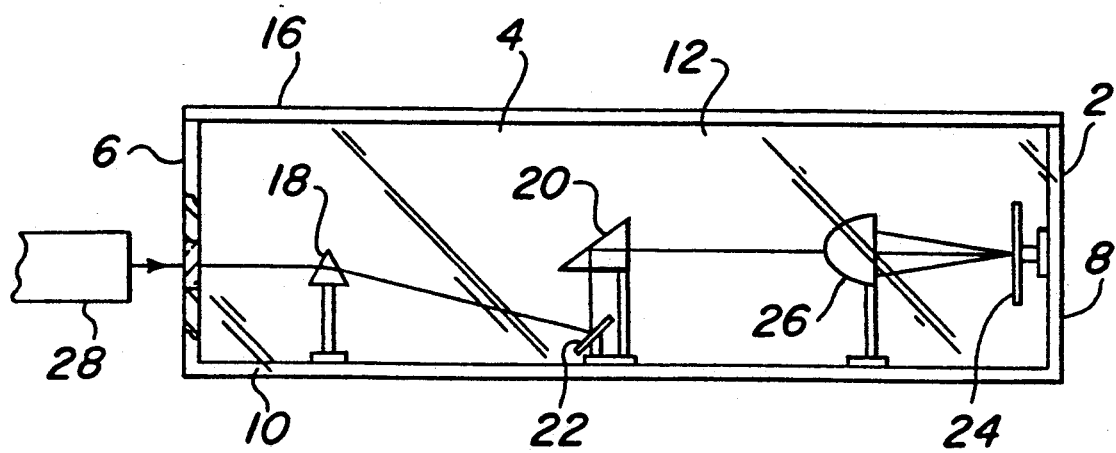
FIG. 2 is a front elevational view of the embodiment of FIG. 1 showing the path of a beam of light being transmitted through the apparatus of this embodiment.

The apparatus illustrated in the embodiment of FIGS. 1 and 2 comprises a liquid tight chamber 2 having a transparent front wall 4 which serves as a window for viewing the interior of the chamber. Wall 4 may be made of any transparent material, such as glass, but, for safety reasons, it is preferably made of a polymeric material, such as poly(methyl methacrylate). Chamber 2 also has a first end wall 6, a second end wall 8, a bottom wall 10, and a rear wall 12. Walls 6, 8, 10, and 12 are all opaque to prevent external light from entering the chamber and interfering with display of the transmitted laser beam. These walls also preferably have black inside surfaces to improve visibility of the light and to absorb stray incident light from the beam, thereby minimizing the possibility of eye injury to persons viewing the displayed beam or in the vicinity of the apparatus. End wall 6 serves as a window for introducing a laser beam into chamber 2. For this purpose it may be transparent, as indicated in FIG. 1, or it may be opaque and have a small window for admitting a laser beam into chamber 2. If end wall 6 is provided with a window, the non-window portion of this wall is desirably opaque and black on its inside. If end wall 6 is transparent, it is usually preferable to provide means for preventing light from escaping through it. This can be accomplished by providing a cover for the laser which also covers end wall 6. Since it may be desired to change the location of the point of entry of the laser beam into chamber 2, it is generally more convenient for end wall 6 to be transparent. When end wall 6 is transparent, it can be made of any transparent material but, like front wall 4, it is preferably made of a polymeric material, such as poly(methyl methacrylate).

Chamber 2 is desirably provided with a means for gaining access to its inside. In the embodiment illustrated in FIGS. 1 and 2, chamber 2 has a top opening 14 which serves this purpose. Chamber 2 is also provided with a lid 16 which has a raised rectangular section 17. The edge of raised rectangular section 17 is adapted to fit into opening 14 in sealing relationship. Lid 16, too, is desirably opaque and has a black inside surface. In the most preferred embodiment all of the walls of chamber 2 are fabricated from poly(methyl methacrylate) and the inside surfaces of walls 6, 8, 10 and 12 and the lid are coated with a flat black paint.

Chamber 2 is filled with a dilute liquid suspension comprised of a clear liquid, which forms the continuous phase, and a particulate substance, which constitutes the discontinuous or disperse phase. Although any clear liquid can be used as the continuous phase, water is particularly preferred because it is inexpensive and presents no handling problems. It also presents the advantages that it is colorless and serves as a good vehicle for the preferred suspended materials. Other less desirable liquids which are useable include clear organic liquids, such as alcohols and glycols.

The disperse phase can be comprised of any organic or inorganic particulate matter whose particle size falls in the desired range and which forms a stable suspension in the continuous phase. The preferred substances for the dispersed phase are the water-dispersible polymers. Examples of water-dispersible polymers which are suitable for use as the disperse phase are copolymers of maleic anhydride, such as styene-maleic copolymer, alkyd emulsion resins, such as phthalic anhydride-glycerol polyester, acrylic and methacrylic acid ester emulsion homopolymers and copolymers, and homopolymers and copolymers of unsubstituted and substituted acrylamides and methacrylamides. The preferred polymeric substances are the homopolymers and copolymers of the alkyl and hydroxyalkyl esters of acrylic and methacrylic acid containing up to 10 and most preferably up to 4 carbon atoms in the alkyl or hydroxy alkyl group.

Representative acrylic ester polymers are poly(ethyl acrylate), poly(butyl acrylate), poly(decyl acrylate), poly(lauryl acrylate) poly(hydroxypropyl acrylate), poly(methyl methacrylate), ethyl acrylate-butyl acrylate copolymer, acrylic acid-ethyl acrylate copolymer, hydroxypropyl acrylate-butyl acrylate copolymer, etc. Examples of preferred acrylic polymers for use in the invention include poly(ethyl acrylate), poly(isopropyl acrylate), poly(hydroxybutyl acrylate), ethyl acrylate-propyl acrylate copolymer, etc. These polymers are commercially available and their preparation forms no part of the present invention.

The concentration of the disperse phase in the continuous phase is sufficient to produce the desired effect, i.e. render the laser beam visible as it passes through the liquid medium, but not so great that it will completely absorb the beam of light or visibly affect the appearance of the liquid. When the concentration of the suspended matter is at the desired level the chamber will appear to be empty even though it is filled with the liquid suspension, provided that the continuous phase is clear and the particle size of the disperse phase is not so large that the particles are visible. The optimum concentration of the suspended matter in the suspension liquid will depend upon the particular material being suspended and the average particular size of the suspended particles. In general, the concentration of the suspended matter in the continuous phase is usually in the range of about 1,000 to about 4,000 ppm, based on the weight of water present in the chamber. In preferred embodiments the concentration of the suspended particles is in the range of about 1,000 to about 2,000 ppm, and in the most preferred embodiments, it is in the range of about 1,000 to about 1,500 ppm, both ranges being based on the weight of continuous phase.

The particle size of the suspended particles in the continuous phase plays a role in achieving the desired effect. The average particle size of the suspended matter should be at least as great as the wavelength of the laser beam being displayed. Generally, the desired result is attained when the average particle size of the suspended matter is about 1 to about 100 times as great as the wavelength of the lightbeam being displayed. In preferred embodiments, the average particle size is in the range of about 1 to about 15 times the wavelength of the transmitted beam, and in the most preferred embodiments it is in the range of about 2 to 6 times the wavelength of the transmitted beam. When the continuous phase is water and the disperse phase is an acrylic polymer the optimum size of the suspended polymeric particles in the water is about 2.5 to about 3.5 times the wavelength of the transmitted beam. The particle size of the suspended medium should be sufficiently small to provide a stable suspension.

The laser beam being displayed can have a wavelength anywhere in the visible spectrum and near infrared range, i.e. about 450 to about 1,000 nm. Lasers having wavelengths of 543.5 nm and 632.8 nm are readily available in the visible spectrum and a laser having a wavelength of 830 nm is available in the near infrared range. The invention is particularly useful for displaying laser beams having wavelengths in the upper part of the visible spectrum. Special equipment is necessary to view laser beams in the infrared range.

Returning now to the drawings, FIG. 2 is a front view of chamber 2 illustrating the display of a laser beam. In FIG. 2, chamber 2 is equipped with an equilateral prism 18, a right angle prism 20, mirrors 22 and 24 and a paraboloidal reflector 26. When chamber 2 is filled with an aqueous suspension of the desired concentration and particle size and a laser beam is directed into the chamber, the path of the beam will be clearly visible. In operation, a laser beam generated by laser 28 is directed into chamber 2 via a window in wall 6 and onto one of the slanted surfaces of prism 18. The beam exiting prism 18 is deflected in a downward direction to mirror 22, which has been placed in the path of the laser beam. Mirror 22 reflects the laser beam to one of the legs of right angle prism 20. The laser beam strikes the prism leg in a direction perpendicular to its surface, enters the prism and is reflected off its hypotenuse in a direction perpendicular to the direction it entered the prism. The reflected beam then passes out of prism 20 through its other leg and is directed through a hole in paraboloidal reflector 26, and toward flat mirror 24. Flat mirror 24 may be positioned slightly askew, so that the lightbeam strikes it at an angle and is reflected to the inside surface of paraboloidal reflector 26. The beam is then reflected back and forth between the mirror and the paraboloidal reflector. It can be appreciated that the optical components illustrated in FIG. 2 are merely exemplary and that other components can be used, if desired. Furthermore, if it is desired, the laser beam can be displayed without optical components.

Figure 3:
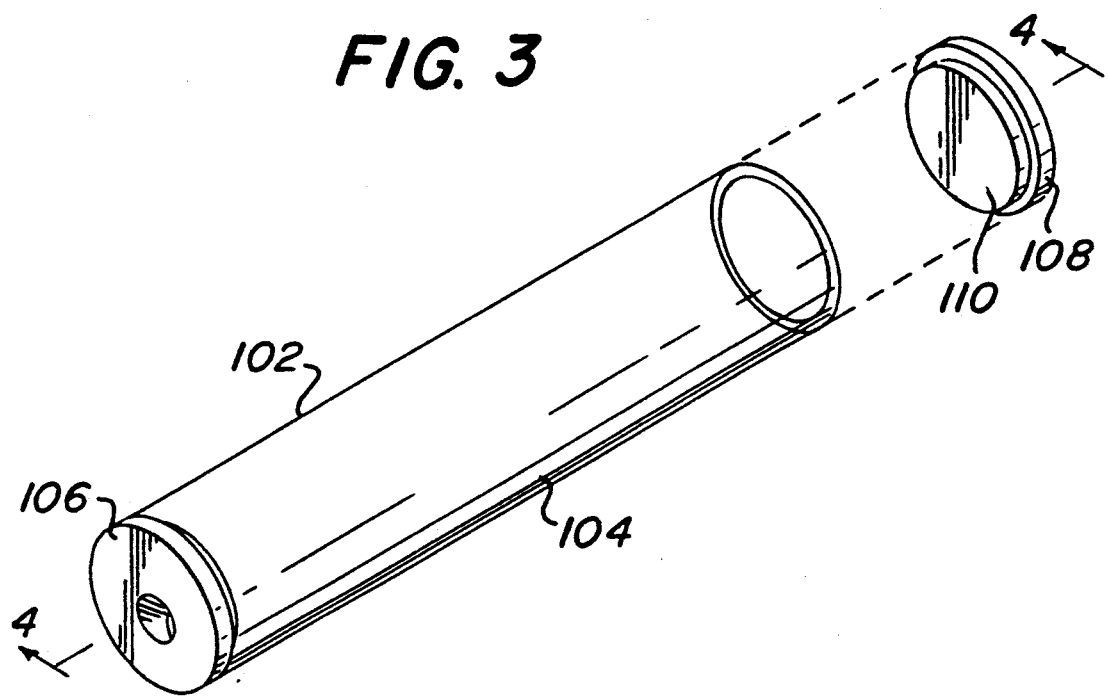
FIG. 3 is an exploded view in perspective of an alternate embodiment of the invention.
Figure 4:
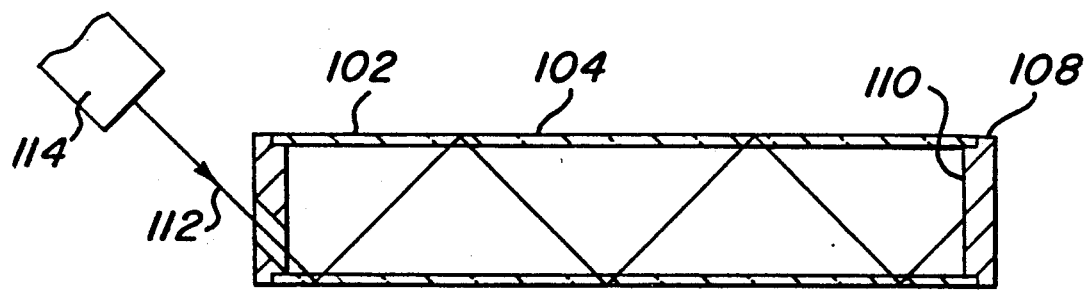
FIG. 4 is a top plan view of the embodiment illustrated in FIG. 3, showing one path that a beam of light being transmitted through a chamber can follow.

The apparatus illustrated in FIGS. 3 and 4 is useful for showing the path of a beam of light which has been reflected off the curved surface of a cylinder. Chamber 102 is a liquid tight compartment comprised of a transparent cylinder 104 and first and second end walls, 106 and 108, respectively. Cylinder 104 is desirably made of a clear, polymeric material, such as poly(methyl methacrylate), although it can be made from other transparent materials, such as glass, if desired. End wall 106 is adapted to permit a beam of light to be transmitted into the interior of chamber 102. To enable this to be accomplished, end wall 106 can be transparent in its entirety or it can have a movable window 107, as was the case with end wall 6 of the embodiment illustrated in FIGS. 1 and 2. If end wall 106 is provided with a window, its non-window portion is desirably opaque and black on its inside. If end wall 106 is transparent, it is preferable to provide a laser cover which also covers end wall 106. As in the embodiment of FIGS. 1 and 2, it is generally more convenient for all of end wall 106 to be transparent. End wall 108, which is positioned on the opposite end of cylinder 104 from end wall 106, can serve as a lid for providing access to chamber 102. In the embodiment illustrated in FIGS. 3 and 4, end wall 108 has a raised portion 110 that is adapted to fit into the end opening of cylinder 104 in sealing relationship. End wall 108 may be attached to cylinder 104 by any means that will provide a liquid tight connection, such as by threaded engagement or by cement. End wall 108 is preferably opaque and has a black inside surface to absorb stray scattered light.

As shown in FIG. 4, laser beam 112, which is generated by laser 114, enters cylinder 104 at an angle of incidence, designated as $\alpha$, which is great enough to prevent a reflection of the beam off end wall 106 and to enable the beam to be fully reflected off the cylindrical surface of cylinder 104. The path of the transmitted beam inside chamber 102 is determined by the position of laser 114 and the direction of transmission of the beam from the laser. It can be appreciated that the beam can be transmitted through chamber 102 along several paths. For example, it can be transmitted in a straight path along or parallel to the longitudinal axis of cylinder 104, or it can be reflected off the walls of cylinder 104. In the latter case, if it is directed in the plane in which the longitudinal axis of the cylinder lies, it will follow a path similar to that shown in FIG. 4. On the other hand, if it is directed along a path that does not lie in any plane common to the longitudinal axis of the cylinder, it will follow a spiral path.

The Table lists examples of suspensions that can be used to fill the chambers of the invention:

TABLE

| Continuous Phase | Dispersed Substance | Conc., ppm |
| --- | --- | --- |
| water | standard acrylic floor polish | 100,000 |
| water | Ropaque ® OP-42$_1$ | 1,000 |
| water | Ropaque ® OP-62$_2$ | 1,000 |
| water | Rhoplex ® AC-235$_3$ | 1,000 |

$_1$acrylic emulsion polymer sold by Rohm and Haas Company
$_2$acrylic emulsion polymer sold by Rohm and Haas Company
$_3$acrylic emulsion vehicle sold by Rohm and Haas Company All of the above suspensions produce stable suspensions which are transparent and invisible to the naked eye, yet they scatter light in such a way as to render a light beam sharply visible through the transparent side wall of the liquid-containing chamber.

The scope of the invention is not limited to the embodiments described in the specification or illustrated in the drawings, but is determined solely by the breadth of the appended claims.

What is claimed is:

1. Apparatus for displaying, and demonstrating the behavior of, a collimated beam of light comprising:
   means providing an elongated, enclosed, hollow compartment having a pair of end walls and elongated side wall means extending from one end wall to the other;
   a substantially clear liquid medium substantially filling the hollow compartment, said liquid being a stable suspension of a particulate substance in a substantially clear liquid, the average particle size of the particulate substance being in the range of about 1 to 100 times the wavelengths of the visible and near infrared spectra;
   means providing a first optically transparent window in one of said end walls of the compartment for permitting the introduction of a collimated light beam into said compartment; and means providing a second optically transparent window in said side wall means, said window extending substantially the entire distance from one of said end walls to the other and permitting simultaneous viewing, by a plurality of persons, of substantially the entire length of the portion, within said compartment, of a collimated light beam extending through said window into the interior of said compartment;

whereby the behavior of said collimated beam of light in said compartment can be clearly observed over an extended period of time.

2. Apparatus according to claim 1 wherein said particulate substance is present at a concentration in the range of about 1,000 to about 4,000 ppm.

3. Apparatus according to claim 1 wherein said particulate substance is present at a concentration in the range of about 1000 to about 2000 ppm.

4. Apparatus according to claim 1 wherein said substantially clear liquid in which said particulate substance is suspended is water and in which said particulate substance is a water-dispersible polymer.

5. Apparatus according to claim 4 wherein said particulate substance is present at a concentration in the range of about 1,000 to about 4,000 ppm.

6. Apparatus according to claim 4 wherein said water-dispersible polymer is an acrylic polymer.

7. Apparatus according to claim 6 wherein said acrylic polymer comprises an acrylic or methacrylic ester.

8. Apparatus according to claim 1 including a laser arranged to project a collimated beam of light, through said first optically transparent window, into said substantially clear liquid medium within said compartment.

9. Apparatus according to claim 8 in which said collimated beam has a wavelength within the range of approximately 400 to 1000 nanometers, and in which the average particle size is in the range of approximately 1 to 100 times the wavelength of said beam.

10. Apparatus according to claim 8 in which said collimated beam has a wavelength within the range of approximately 400 to 1000 nanometers, and in which the average particle size is in the range of approximately 1 to 15 times the wavelength of said beam.

11. Apparatus according to claim 8 in which said collimated beam has a wavelength within the range of approximately 400 to 1000 nanometers, and in which the average particle size is in the range of approximately 2 to 6 times the wavelength of said beam.

12. Apparatus according to claim 8 in which said collimated beam has a wavelength within the range of approximately 400 to 1000 nanometers, in which said particulate substance consists of particles of an acrylic polymer, and in which the average particle size is in the range of approximately 2.5 to 3.5 times the wavelength of said beam.

13. Apparatus according to claim 8 having at least one optical component submerged in said substantially clear liquid medium and in the path of said laser beam, said optical component being a component from the group consisting of reflectors and refractors.

14. A method of displaying, and demonstrating the behavior of, a collimated beam of light comprising:

projecting said beam through an optically transparent window in one end of an elongated, closed chamber having a viewing window extending substantially the full length of said chamber, in the direction of its elongation, from said one end to the end opposite to said one end;

scattering a portion of the light of said beam in said chamber by means of dispersed particles having an average size in the range of about 12 to 100 times the wavelength of said beam, said particles being stable suspended in a liquid substantially filling said chamber and present in the liquid in an amount such that the suspension is substantially clear; and visually observing the beam from the side thereof by viewing the scattered light through said viewing window.

15. The method of claim 14 wherein said liquid is water and said particles are particles of a water-dispersible polymer.

16. The method of claim 15 wherein said water-dispersible polymer is present at a concentration in the range of about 1,000 to about 4,000 ppm.

17. The method of claim 15 wherein said water-dispersible polymer is an acrylic polymer.

18. The method according to according to claim 14 in which said beam is a laser beam, and in which the average size of said particles is in the range of 1 to 100 times the wavelength of said laser beam.

19. The method according to claim according to claim 18 in which said laser beam has a wavelength within the range of approximately 400 to 1000 nanometers, and in which the average size of said particles is in the range of approximately 1 to 15 times the wavelength of said laser beam.

20. The method according to claim 18 in which said laser beam has a wavelength within the range of approximately 400 to 1000 nanometers, and in which the average size of said particles is in the range of approximately 2 to 6 times the wavelength of said laser beam.

21. The method according to claim 18 in which said collimated beam has a wavelength within the range of approximately 400 to 1000 nanometers, in which said particles are composed of an acrylic polymer, and in which the average size of said particles is in the range of approximately 2.5 to 3.5 times the wavelength of said laser beam.

22. The method according to claim 18 in which said laser beam interacts with at least one optical component submerged in said liquid and in the path of said laser beam, said optical component being a component from the group consisting of reflectors and refractors.

* * * * *